(12) United States Patent
Hopperus-Buma

(10) Patent No.: US 9,068,299 B2
(45) Date of Patent: Jun. 30, 2015

(54) TOUGH, WATER-PERMEABLE PAVER

(76) Inventor: Peter Barend Hopperus-Buma, Auckland (NZ)

( * ) Notice: Subject to any disclaimer, the term of this patent is extended or adjusted under 35 U.S.C. 154(b) by 171 days.

(21) Appl. No.: 13/395,451

(22) PCT Filed: Sep. 7, 2010

(86) PCT No.: PCT/NZ2010/000179
§ 371 (c)(1),
(2), (4) Date: Mar. 12, 2012

(87) PCT Pub. No.: WO2011/031168
PCT Pub. Date: Mar. 17, 2011

(65) Prior Publication Data
US 2012/0171465 A1     Jul. 5, 2012

(30) Foreign Application Priority Data
Sep. 11, 2009   (NZ) .......................................... 579597

(51) Int. Cl.
| | | |
|---|---|---|
| *E01C 11/22* | (2006.01) | |
| *B29C 67/24* | (2006.01) | |
| *C04B 20/10* | (2006.01) | |
| *C04B 30/00* | (2006.01) | |
| *E01C 5/22* | (2006.01) | |
| *C04B 111/00* | (2006.01) | |
| *C04B 111/70* | (2006.01) | |

(52) U.S. Cl.
CPC ..... *E01C 11/225* (2013.01); *Y10T 428/249985* (2015.04); *Y10T 428/2998* (2015.01); *B29C 67/243* (2013.01); *C04B 20/1033* (2013.01); *C04B 30/00* (2013.01); *C04B 2111/00284* (2013.01); *C04B 2111/70* (2013.01); *E01C 5/22* (2013.01)

(58) Field of Classification Search
USPC ............................................... 428/317.7, 403
See application file for complete search history.

(56) References Cited

U.S. PATENT DOCUMENTS

| | | | |
|---|---|---|---|
| 3,788,883 A | 1/1974 | Rostler et al. | |
| 5,432,213 A | 7/1995 | Kim et al. | |
| 5,925,695 A * | 7/1999 | Ohtsuka et al. ................ | 524/68 |

(Continued)

FOREIGN PATENT DOCUMENTS

| | | |
|---|---|---|
| DE | 19757746 | 6/1999 |
| GB | 1332966 | 10/1973 |

(Continued)

OTHER PUBLICATIONS

Translation of JP 2005090167, Oishi et al., Apr. 7, 2005, 11 pages.*
International Search Report, PCT/NZ2010/000179 dated Dec. 14, 2010.

*Primary Examiner* — Hai Vo
(74) *Attorney, Agent, or Firm* — Young & Thompson

(57) ABSTRACT

A tough water-permeable paver block includes a mass of adherent coated granules with intervening contiguous channels. A method for making pavers includes selecting a gravel, heating, then evenly coating every granule with a non-rigid thermoplastics material typically at about 75 g/kg gravel, placing the hot material into a form, then cooling, optionally under imposed pressure. In one option the paver is formed from loose granules at its final resting place. The material may be provided as a coated, non-adherent gravel for heating into a coherent mass in situ. Applications include footpaths, roads and drain covers.

5 Claims, 2 Drawing Sheets

(56) References Cited

U.S. PATENT DOCUMENTS

Figure 1:
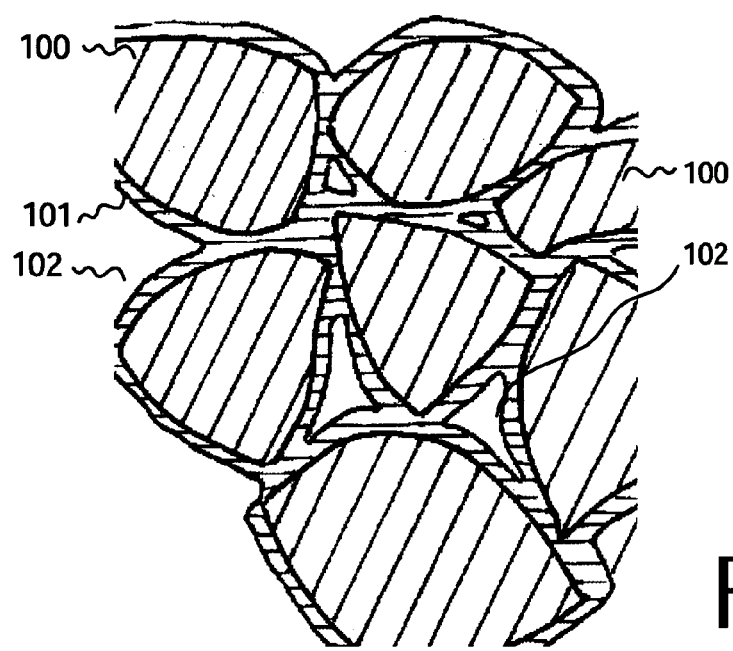

| | | | |
|---|---|---|---|
| 6,103,783 A | 8/2000 | Hong | |
| 2007/0062416 A1* | 3/2007 | Brzuskiewicz et al. | 106/657 |
| 2007/0269265 A1* | 11/2007 | Thorkelson | 404/34 |
| 2009/0067925 A1* | 3/2009 | Kaul | 404/17 |
| 2010/0133166 A1* | 6/2010 | Qin et al. | 210/290 |

FOREIGN PATENT DOCUMENTS

| | | |
|---|---|---|
| GB | 1402003 | 8/1975 |
| WO | WO 2008043271 A1 * | 4/2008 |

* cited by examiner

_(1)_

TOUGH, WATER-PERMEABLE PAVER

FIELD

This invention relates to relatively coarse-grained, tough, permeable pavement block components made of a composite material.

DEFINITIONS

"Pavement" and "sidewalk" and "roadway" are similar terms; used interchangeably herein.

"Paver" as used herein refers to a generally flattened rectangular mass or block of constructional material; a brick-like or a slab-like cube having a length and a breadth and a thickness between the top and the bottom of a pavement block component as installed.

BACKGROUND

Previously known versions of manufactured permeable paving based on adherent granules have been substantially rigid and liable to crack and break. Known binding agents used in prior-art pavers include a sand-free mortar based on a Portland cement or a thermosetting resin such as a two-pot epoxy resin. A significant setting time adds to the cost of manufacture for each. Pavers made using either option are weak and prone to catastrophic failure involving brittle fracture. A permanently set glue is not easily compatible with field repair.

Large flat areas of concrete require special attention to drainage since concrete is impervious. Such footpaths affect growth of cultivated shrubs and trees which may have roots extending beneath the footpath. Roots, or the soil around roots, require air. Therefore a highly pervious version of concrete would be desirable, considering the inevitable tendency for pores to be blocked by detritus.

Pervious concrete can be made using impervious concrete pavers with pervious joints between them. A recent publication (Comment by R Gaimster, p 54, "Contractor" (New Zealand), September 2010) describes a surface of 80×170 mm impermeable pavers separated by 10 mm permeable joints each comprised of sized gravel fixed in place with a sand-free concrete mix. Although the joint itself has a permeability of around 15-25%, the joint area is only 6% of the total paved area.

PRIOR ART

A search within the IPC classification groups C04B18 or C04B26, and the words "thermoplastic" and "porous" revealed GB1332966 describing an open porous rock structure, using contiguous rock particles of an un-graded range of sizes, producing contiguous voids. A bonding agent of 75 to 25% by weight of a thermoplastic elastomer and 25 to 75% of a compatible stiffening resin holds the particles together for use as railway ballast. At least Example 14 describes a cold-setting liquid process to be sprayed on to a formed railway track. The elastomer causes the particles to cohere.

GB 1402003 describes a bituminous composition comprising a styrene or styrene/butadiene copolymer emulsion or solution homogeneously mixed with a bituminous emulsion, mixed with a large amount of aggregate or crushed granite, and the resulting semi-solid, hardening composition used to make road or pavement surfaces at 3 kg. or 5 kg. of polymer emulsion (calculated as solids) to 100 kg. of crushed granite, to form a paving composition of undefined porosity. Both listed patents describe a permanently setting banding agent.

OBJECT

The object of this invention may be stated as to provide a manufactured, permeable, yet tough paving block or paver or at least to provide the public with a useful choice.

SUMMARY OF THE INVENTION

In a first broad aspect this invention provides a permeable paver having a regular shape; each paver having one or more sides enclosing an area having a thickness and a top and a bottom surface; characterised in that the paver is a composite material comprised of a plurality of stiff or rigid granules selected from a range including gravel, small stones, crushed rocks, crushed glass, and rubber pieces, whether sorted by size or not; each granule has a coating of a layer of a thermoplastics material that is made contiguous with the coating of closely approaching granules; the paver also including a continuous network of open channels or spaces passing through the thickness of the paver between the plurality of coated granules thereby allowing a fluid to permeate through the paver.

Regular shapes include rectangles, polygons and circles, also replacements for gratings.

In a preferred option, each granule is comprised of a selected grade of gravel; preferably washed.

Alternatively the gravel is comprised of an unsorted mixture of grades.

Optionally some of the granules may be comprised of a natural or artificial rubber, such as shreds of used tyres.

In a first aspect, each paver retains the dimensions of a mould or die within which a plurality of inorganic granules that had been coated with the thermoplastics material and heated to a temperature above the softening temperature were allowed to cool to a temperature at which the thermoplastics material is not soft.

Preferably the granules have an average diameter of 7 to 12 mm for use on a path surface.

Alternatively the granules have an average diameter of 12 to 18 mm for use in an application requiring higher permeability. high water flow as in a grate or retaining wall.

Optionally the granules have been subjected to a process of mechanical abrasion, in order to remove sharp edges, before becoming coated.

In a second related aspect, the thermoplastics material has a softening temperature of at least 90 degrees Celsius and is selected from a range including virgin or recycled high-density polyethylene (HDPE), polypropylene, nylon, polyethylene terephthalate, and alloys and mixtures thereof.

Preferably the weight proportion of thermoplastics material added to the granules is in the range of 60 to 90 g per kg of dry granules.

More preferably, high-density polyethylene is used as the thermoplastics material and the weight proportion of thermoplastics material added to the granules is 75 g per kg of dry granules.

Optionally the thermoplastics material is mixed with at least one substance capable of retarding ultraviolet degradation of the thermoplastics material such as by sunlight.

Optionally the thermoplastics material is mixed with at least one coloured substance.

In a second broad aspect the invention provides a free-flowing composite material, is comprised of a dissociated plurality of granules each coated with a limited and evenly distributed amount of an elastic thermoplastics material; the granules of the composite material being capable when heated to above the softening temperature of the thermoplastics material and placed in contact with one another of becoming adherent to each other, thereby forming a coherent mass after cooling.

In a third broad aspect the invention provides a method for making permeable pavers, wherein particulate material is washed, graded, dried and weighed; the particulate material heated to a temperature sufficient to melt but not to decompose the thermoplastics material, and a measured weight of thermoplastics material is added, while stirring, so that the particulate material becomes coated with the thermoplastics material; optionally the hot mixture is vibrated to help the granules settle together, before or instead of compression; preferably the mixture is them held or compressed in one axis inside a die having predetermined dimensions, and is soon cooled, so that the thermoplastics material becomes solid before it can flow, thereby ensuring that the solidified composite material is permeable throughout.

An optional method for preparation of permeable pavers on location, including fusion to adjacent materials, also applicable to maintenance of pavers, commences with purchase of granules previously coated with a thermoplastics substance then allowed to cool without forming a strongly bound mass; placing and compacting the granules, heating the granules and the area surrounding the deficiency if required such as with a hot-air gun, then tamping down the granules such as with a vibrating roller until the surface is flat.

DETAILED DESCRIPTION OF THE INVENTION

The description of the invention to be provided herein is given purely by way of example and is not to be taken in any way as limiting the scope or extent of the invention. Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Reference to cited material or information cited in the text should not be understood as a concession that the material or information was part of the common general knowledge or was known in New Zealand or any other country.

DRAWINGS

Figure 2:
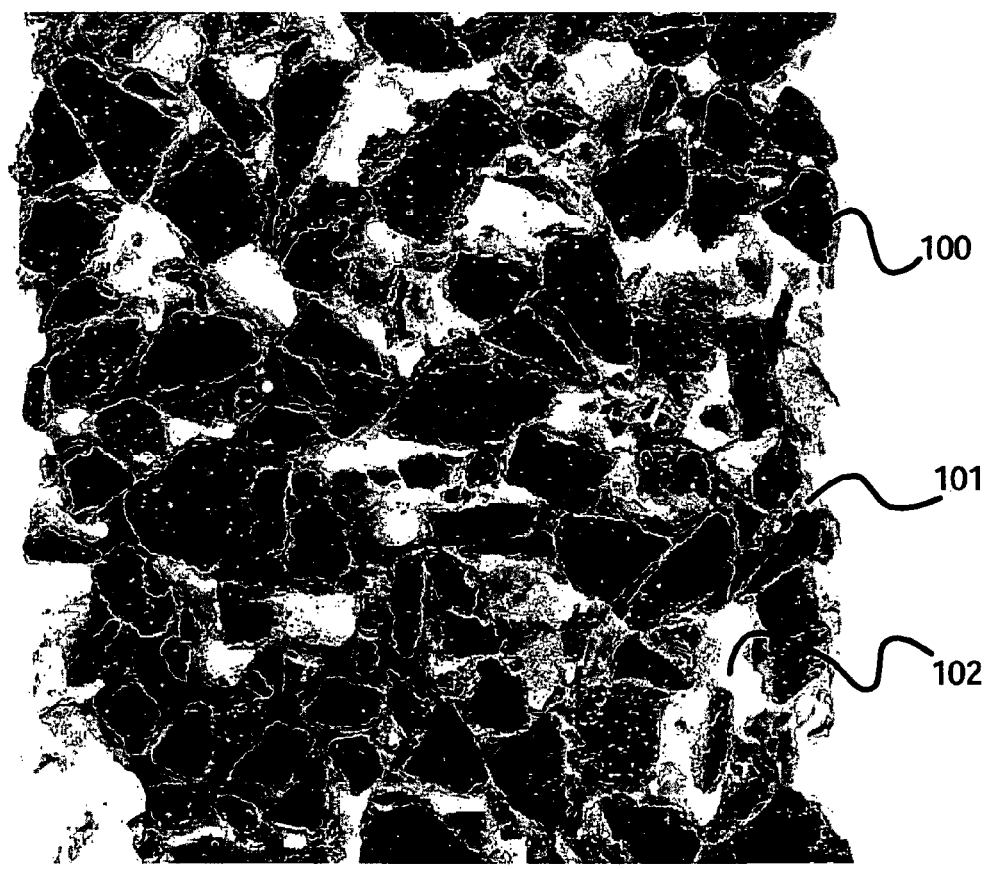
Figure 3:
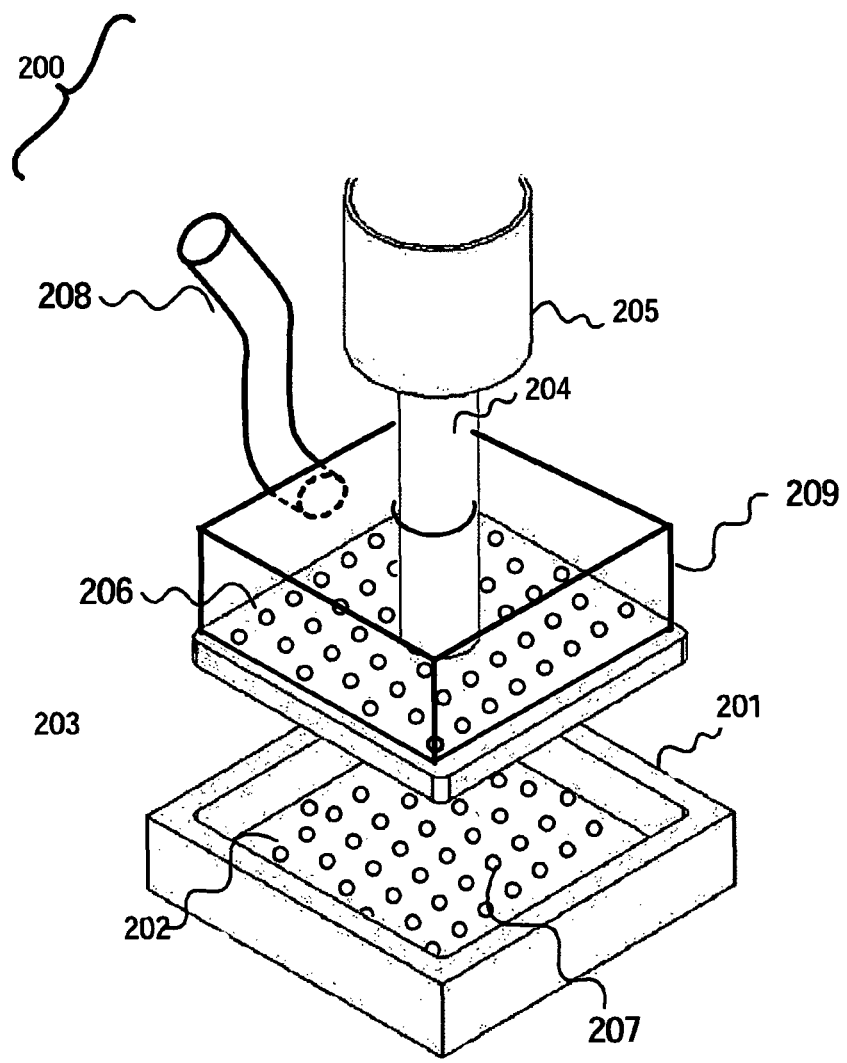

FIG. 1: is a diagram of a section through part of a paver.
FIG. 2 is a photograph of a cut made using a brick saw through an actual paver.
FIG. 3: is a diagram showing an example die and press.

This invention describes a paver; an artificial composite substance in a regular block form, made for use as part of a pavement or for similar purposes. Typically each installed paver has a working top surface having a length and a breadth (or a diameter), and each paver has sufficient thickness between the upper and a lower surface. The paver uses granules of a hard-wearing rigid or stiff abrasion-resistant substance like gravel or glass, or perhaps recycled rubber. The granules are coated with, and held against each other by, a specified type and amount of a flexible binder, a thermoplastics material which incompletely occupies the spaces between the granules. The proportion of binder is limited. Because sufficient open spaces are contiguous along tortuous, interconnected paths, a fluid such as air or water can pass through the entire paver in any direction, though most usefully water passes from the upper to the lower surface.

The body of the paver is comprised of three phases as shown in a drawing in FIG. 1 and in a cross-section in FIG. 2. Rigid granules 100 have a relatively even coating of a thermoplastics material 101 that becomes fused to the coating of adjacent granules at contact or close-approach points and (c) open spaces 102 between the rigid granules where their coatings are not fused together. It was found that pavers could be cut cleanly with a standard brick saw. In the macrophotograph of a cut surface of a 75 mm thick paver in FIG. 2, the granules 100 of crushed gravel are dark grey, the thermoplastics material 101 is a medium grey and air-filled spaces 102 are white.

Materials

In the preferred embodiment, each granule is comprised of a selected gravel; preferably washed. The gravel may be river-worn, crushed, or otherwise processed. Gravel may be graded by size. If not graded, remaining smaller granules tend to fill the space between larger granules. Suitable kinds of gravel include without limitation (a) black, basalt-rock gravel (road metal), (b) white rock such as marble chips, (c) coloured gravel including iron-rich rocks, granite pebbles, scoria, schist, greywacke, and the like. A selection would normally be optimised for cheapness in the first instance. Red, pink, white, light grey, dark grey or black colours are obtained easily from selected rock material. In some applications, a white gravel may be useful in order to reduce absorption of heat from the sun. Other colours may be required in some applications, for architectural or other reasons. Colour may be achieved by selection or by mixing. Colouring matter may be included with the thermoplastics material, such as carbon, ironsand, red iron oxide, white titanium dioxide, and yellow, green or blue or inorganic powders including chromium, copper or cobalt. Coloured plastics granules, fibres, or powder may be included with the thermoplastics material.

The invention may use discarded glass. This may be processed cold, preferably-tumbled in order to remove sharp edges in applications where people are likely to run or fall onto the surface and by cut by sharp edges, or the glass may be re-melted in a furnace into spheroidal shapes and then annealed and treated like gravel. Crushed glass can be used as a raw material. Experiments to raise the adherence of the thermoplastics material to smooth glass surfaces are continuing, such using as a two-part process wherein the glass is thinly coated with an adherent material before addition of thermoplastics material.

The invention may use discarded rubber, such as shredded fragments of discarded vehicle tyres perhaps as a proportion of the stone or glass, or be entirely made of natural or artificial rubber cut approximately into cubes. Rubber may be re-vulcanised to make it harder. Rubber will modify the properties of the paver and perhaps require a more flexible form of thermoplastics: for instance a low-density polyethylene rather than a high-density polyethylene. A paver may include a proportion of resilient rubber and a proportion of a hard granular substance. Pavers made at least in part from a rubber particulate material will be more flexible and create less impact noise, and will be better able to tolerate impacts.

Adherent Material or Binder

A thermoplastics material is used as a granule coating and binding, holding the granules together in an adherent mass. Sufficient adhesive is added to uniformly coat all the granules yet leave intervening spaces open. Paver manufacturing techniques according to this invention are intended to maintain porosity. Examples of thermoplastics material include polymerised ethenes and the like. At this time high-density (crystalline) polyethylene (HDPE) is readily available and is preferred, although polypropylene, nylon, and mixed low- and high-density polyethylene are obvious alternatives. The low-density polyethylenes are more flexible and resistant to cracking. The inventor prefers not to use the materials known as "hot glues". Their softening points are too low. See also "Variations" below.

Optionally the thermoplastics material is mixed with at least one substance capable of retarding ultraviolet-promoted weathering of the thermoplastics material, if the application merits a degradation-free product. It should be noted that in any case such degradation is limited to the top surface only. One example substance is the colorant carbon black, at a moderate concentration such as 1-5% by weight of the thermoplastics material. Where the colour of the underlying granules is to remain visible, other ultraviolet protectants compatible with the selected thermoplastics material and known to a worker skilled in the art may be used; for instance UV1000LL LDR 2% obtained from Rainbow Masterbatch Ltd at 12 Sir William Ave East Tamaki Auckland, New Zealand. Alternatively an acrylic resin such as "Sun Defier" acrylic UV protectant glaze, from Resene Ltd, at PO Box 38 242, Wellington Mail Centre, New Zealand may be applied. The uppermost adherent coating may be removed by wiping when quite hot, or with a solvent when cold.

Example 1

Process

Selection of granular material and thermoplastics has been described previously in this section. Optionally the crushed stone or crushed glass is tumbled in order to remove sharp edges. Tumbling tends to reduce granules towards spherical shapes and raises surface roughness and the amount of removal of sharp edges is determined by the end application of the pavers. For example, if used in roading, sharp edges are tolerated but if used around playgrounds, rounded granules are preferred.

In order to retain permeability, a controlled amount of thermoplastics material with the granules are then heated under control so that when the hot, evenly coated granules are poured into a mould or die the thermoplastics material is sticky and viscous, but not so hot that it flows freely and tends to flow to the lowest part of a paver in the die before setting as a contiguous, impermeable layer. Steps:

1. Selected particulate or granular material is washed, dried and weighed. Suitable quality assurance procedures are used. Size sorting is optional.
2. The granules are then heated in a hopper such as by a flame or with hot gas while stirring them so as to evenly distribute the heat, to a temperature of perhaps 20 deg C. above the melting point of the selected thermoplastics material. If rubber is used, heating has to be done with more care. While the exact temperature at mixing time depends on the composition of the thermoplastics material, 270-320 deg C. (530-608 deg F.) is a preferred working temperature for a predominantly high-density polyethylene thermoplastics material. A required degree of fluidity determines the temperature, although too high a temperature wastes energy, increases thermal decomposition and renders the thermoplastics material too fluid.
3. The hot granules are released from the hopper through a measuring station so that known weights are used.
4. The thermoplastics material is added to the hot granules typically at about 65 to 85 g per kg of granules. One preferred rate is HDPE at 75 g per kg of granules.
5. The mixture continues to be stirred while the temperature of the over-hot granules melts the thermoplastics material so that it flows, evenly coating the granules.
6. The hot mixture is then tipped or extruded into a mould having predetermined dimensions. Extrusion can provide for continuous lengths.
7. Optionally the mixture is agitated within the mould, so that the proportion of granule surface in contact with other granules is raised and the paver becomes more solid. Note that the potential porosity will fall, especially if the molten thermoplastics material inadvertently flows, under the influence of gravity, to the bottom of the mould. Agitation will allow the proportion of thermoplastics material to be reduced. The amount of agitation depends on the granule shapes and how quickly they become packed together.
8. The mixture is preferably pressed into the mould from the upper surface by a ram while it cools and set solid, so that the upper surface becomes relatively flat for use as a working surface.
9. The mass of the mixture in the mould or die is then rapidly cooled using a flow of air or water so that the thermoplastics material becomes solid before it flows far, thereby ensuring an even amount of adhesion between top and bottom areas of the paver, and ensuring that the solidified mixture provides a permeable paver. Rapid cooling helps to prevent the thermoplastics material from flowing. The inventor has found that suction is preferable as a cooling means since suction provides cooling throughout the mass of the paver. The evolved gases are fed to the gas flame so that any smoke is destroyed. There may be some decomposition of the thermoplastics material while it is hot, and exclusion of oxygen from the hot mix may help reduce decomposition.
10. The paver can easily be released from the walls of the mould or die after the thermoplastics material has shrunk a little while cooling and parting from the walls.
11. Each paver is inspected, may be tested, and is stacked for shipping.

An example of a paver manufacturing die or press 200 is shown in FIG. 3. Here, a rectangular rim having desired dimensions 201 and depth surrounds a floor 202 of a die or mould 201. A press surface 203 is supported on a shaft 204 used to couple a pressing force generated within a hydraulic ram or lever-operated mechanism 205, so that the hot coated particulate material can be held under uni-axial pressure while cooling. The ram and the mould may be perforated (by arrays of holes 202 and 206, or may be made as a strong mesh (not shown)) so that air or water can flow through while the hot coated gravel is under pressure. A shroud 209 over the press surface 203 is connected to a pump, preferably but not necessarily connected as a suction pump. If an upward suction of air is maintained through a perforated mould 202, through the hot mass, and into the perforated press surface 203, the upward direction of flow tends to counteract any effect of gravity on the hot thermoplastics material. Withdrawn hot air is either used for heating of cold granules or is burnt in the gas flame so that smoke is destroyed.

An example die 201 has a rectangular cavity, 300×300 mm in area, and is at least 50 mm, more preferably 100 mm in height. Other example dies are provided to suit user requirements; for instance a brick: 230×115×75 mm; or a silt trap cover over or a water filtration membrane slab. Any acceptable dimensions may be used, whether rectangular or not. Customised die shapes and sizes are provided to suit user requirements.

Results of Manufacture

Table 1 illustrates some example combinations of granular matter and thermoplastics coating, and resulting parameters, although the skilled reader will appreciate that many variations on the versions disclosed here may be applied. Porosity is a functional measure of fluid transfer.

TABLE 1

Some example pavers.

| Granule type | Granule sieve size | Thermoplastics type used | Thermoplastics proportion w/w | Porosity | Void ratio |
|---|---|---|---|---|---|
| Gravel, river-rounded | 10 mm | HDPE | 65 g/kg | 10% | 7.5:1 |
| Gravel, crushed | 10 mm | HDPE plus UV absorber | 75 g/kg | 20% | 5:1 |
| Marble chips | 10 mm | HDPE | 80 g/kg | 20% | 5:1 |
| Crushed glass | 10 mm | HDPE | 85 g/kg | 10% | 8:1 |
| Rubber shreds | 10 mm | HDPE, including recycled HDPE | 75 g/kg | 15% | 7.5:1 |

Test Methods

All are approximate and comparative tests, for permeability and structural strength.
1. Water permeability or porosity. A paver having defined dimensions is placed in a large close-fitting aperture in the base of an open box about 400 mm high. Water is tipped into the box rapidly from a 20 liter bucket and the time taken for the box to empty is recorded, indicating the porosity. Note: Void ratio is a stereological property, the ratio of open space area to solid material area of a cut section, as in FIG. 2. Interconnection of spaces is not proven.
2. Impact resistance in a test to destruction. A paver under test is repeatedly thrown down onto a concrete surface until it breaks. The resulting fragmentation is described.
3. Beam strength, as tolerance to steady pressure from a vehicle tyre. A paver is supported above a surface along two opposite edges upon, for instance, other pavers. A truck is driven on to the paver midway between the supports.
4. Deflection, carried out by applying compression, over a space.
5. Compression. A paver is subjected to compression in one axis in a press.
6. Weathering. A paver is exposed to sunlight for some months.
7. Extent to which the exposed upper surface could injure a falling person such as by having exposed sharp edges. The potential to cause injury is assessed by feeling and visually inspecting the surface.

Test Results

1. Water Permeability test: Typically, 2500 liters water per square meter per minute (40 gallons per square foot per minute). The approximate pressure applied in this test was 7 mbar, or 3 inches of water.
2. Impact resistance: A permeable paver using a two-pot resin as the glue easily shattered into a large number of individual granules plus several larger pieces. A similar-sized permeable paver including a HDPE binder survived a number of similar impacts without damage and eventually broke into two parts, without any separation into individual granules.
3. Steady pressure: Beam strength: A 300×200 mm paver was supported at 200 mm centres, and a beam load was applied across the paver between the supports by means of a hydraulic press. The paver fractured at 1200 kg and continued to support 400 kg in its fractured state.
4. Deflection 500 kg applied for 1 hour caused 0.25 mm deflection at 15 deg. C., or 0.75 mm deflection when carried out at 30 deg C.
5. Compression. Test samples withstand greater than 6000 lbs per square inch—or 50 tons per 300×300 paver.
6. Weathering: The HDPE plastics material tends to separate from the exposed surfaces and tends to whiten and become brittle after some months, but this is limited to the top surface only. Experiments are continuing to minimise this effect, including varying the composition of the thermoplastics material such as by means of additives, and removing—as in "wiping"—the exposed thermoplastics, and brushing on an overcoat of an acrylic resin.

Manufacture In Situ

This invention provides for supply of selected granules pre-coated with selected thermoplastics material by a factory process, and then sold "loose" as a dissociated plurality of granules to be reheated and formed into a solid mass on a site by workers without requiring particular skill. In this case, boxing or similar temporary edging or retaining structures are built in order to hold the permeable material in place.

A volume (or weight) of particulate matter is evenly heated in an operating mixer such as a conventional jobber's concrete mixer, and after a desired temperature is reached (tested for example with an infra-red digital thermometer) heat is removed and a volume (or weight) of thermoplastics material is added and the two are mixed so that the particulate matter is evenly coated. The mixture is then tipped into the boxing, consolidated such as with a roller, and cooled, such as with ample water, as soon as possible. If tree roots lie beneath, they should be protected during installation with some thermal insulation such as rock wool, which also allows for later growth. This option particularly allows the invention to be installed and used on irregular sites where the underlying foundation is not flat, such as along a railway line at a level crossing. Additional thermoplastics material, supplied separately, may be heated and applied around borders to which the granules are to become bonded.

Joining and Re-Joining

Repairing broken pavers, or re-shaping pavers in the field can be done using a hot-air gun. While hot, a paver can be re-shaped on a site such as when sawing with a motorised brick saw is not possible. A break can be repaired, after heating in the same way. The open channels through the paver assist in heat transfer from the hot air. A method for repairing broken or cut-apart pavers according to the invention comprises the steps of: (a) heating at and about the exposed edges with a hot-air gun to about 250-300 degrees C. (480-570 deg F.) which will soften the bonding thermoplastic material, (b) optionally adding thermoplastics material to poorly coated surfaces by melting a rod of thermoplastics material against the hot, exposed edges so as to coat the exposed granule surfaces, (c) bringing the broken edges together then (d) cooling them such as with the hot-air gun but with heating turned off.

This method allows pavers according to this invention to be "glued" to adjacent surfaces such as concrete edges, or to rails at railway level crossings.

Variations

It is realised that improvements may be made in the kind of thermoplastics material used. At this time the preferred basic material is polyethylene; particularly high-density polyethylene, optionally with additives such as plasticisers and protectants against ultraviolet light. It is cheap and often available from recycling plants. Virgin material may be cheaper than recycled, washed material.

Other thermoplastics that may be used separately or in combination include branched chain molecules, ethylene copolymers, chlorinated polyethylene, polypropylene, polybutene, polyisobutylene, poly-4-methyl pentene 1, styrene polymers, vinyl acetate copolymers, polyvinyl chloride and other halogen-containing polymers, polyvinylidene chloride, methacrylates and polymethyl methacrylate, polycarbonate, polyethylene terephthalate, Nylons, and plastics based on cellulose. Preferably, alloys should comprise compatible thermoplastics materials having similar softening temperatures. The inventor prefers thermoplastics materials with higher softening or melting temperatures such as from about 90 degrees Celsius upwards, since they will remain tough at high outdoors ambient temperatures.

Preferred alloys, blends or copolymers include those "accidental" blends arising from recycling of plastics food packages principally comprising mixed polyethylene and polyethylene terephthalate containers. Polypropylene, which tends to be poorly biodegradable and has a higher softening temperature than the densest polyethylene, is particularly useful as a fibrous filler in the thermoplastics material to add strength across spaces between granules. Plastics materials suitable for the above purpose may not yet have been synthesised while it will be appreciated by one skilled in the relevant arts that such new plastics will be appropriate.

Broken glass may be first coated with a thin layer of a settable, adherent bonding material and then with a thick layer, as before, of a thermoplastics material that is adherent to the bonding material. Hydrofluoric acid may be used to etch the glass chemically in order to promote bonding.

Sand may be sprinkled over a top surface of thermoplastics material while it is molten in order to give the surface more grip. The finished paver may be painted with an acrylic resin.

Scoria, a reddish porous volcanic rock, may be used as the granules. The high surface area to volume ratio of scoria may be an advantage, in filtering processes. The lighter weight of a scoria porous paver may be an advantage.

Moulds of any acceptable shape and dimensions may be used, such as shaped covers over drains, sections of a circle for surrounding the trunk of a tree, or round pavers. Applications include footpaths with drainage concealed below, and protection for tree roots It would be possible to make a laminated paver with some rigid granular materials below, and resilient granules above, by pouring two premixed types of granule into a die before further processing, to give desired impact properties in combination with rigidity.

INDUSTRIAL APPLICABILITY AND ADVANTAGES

The paver as described is a relatively cheap product which may use a substantial proportion of recycled materials and which may be made with low-cost equipment.

The manufacturing process does not involve a lengthy curing process; it requires only cooling.

The preferred adherent material used in making the pavers is flexible so that the finished paver, when cooled to an environmental temperature, is tough and does not behave like a brittle material. One would expect a block made out of large particles to be inherently weak.

The preferred adherent material is not a thermosetting plastics material, on-site fusing of the permeable pavers to adjacent concrete or metal surfaces is possible.

Applications for the permeable paver described herein include footpaths (sidewalks) which can drain surface water away; such as by having alternate permeable and impermeable sections. There is no break in the continuity of the walking surface. In one layout a strip of permeable paver is periodically placed across an elongated area of concrete. Under the paver, a layer of gravel above a layer of sand and above a drainage pipe may have been installed. The area of concrete may slope slightly down toward the paver. Water, which may freeze into slippery ice, is thereby removed. In another layout suitable for electrically operated wheelchairs for instance, the footpath has a slightly concave surface facing upward for drainage, is generally horizontal in a lengthwise aspect, and has a central strip of paver at the lowest point, again preferably lying on top of drainage means. Too great a slope can be inconvenient for wheelchairs or shopping trolleys. Permeable pavers in combination with sand and gravel filters serve to exclude some pollutants including sheet material from being drained into rivers and lakes. This approach to footpath construction allows drainage to be installed at predetermined positions rather than haphazard formation of pools of water.

Although concrete slabs contract during curing and subsequently expand when heated, inherent flexibility of the interposed thermoplastic paver retains integrity of the surface with fewer expansion joints along a footpath.

Permeable pavers according to the invention provide protection for tree roots yet support life, such as for those trees that grow alongside footpaths or sidewalks or along the side of roads. The permeable pavers admit air and water to the soil surrounding the roots.

Some railway level crossings would benefit from use of a freely permeable surface adjacent to and between the rails, so that potholing of standard tarmac under wet conditions, which is otherwise likely, does not occur.

Finally, it will be understood that the scope of this invention as described by way of example and/or illustrated herein is not limited to the specified embodiments. Where in the foregoing description, reference has been made to specific components or integers of the invention having known equivalents, such equivalents are included as if individually set forth. Those of skill will appreciate that various modifications, additions, known equivalents, and substitutions are possible without departing from the scope and spirit of the invention as set forth in the following claims.

I claim:

1. A tough water-permeable paver having a regular shape; the paver having one or more sides enclosing an area having a thickness and a top and a bottom surface; wherein the paver is a composite material comprised of (a) a plurality of coated, rigid granules, each coated rigid granule is a rigid granule surrounded by a coating, the coating of each coated rigid granule is contiguous with and fused to the coating of all adjacent coated rigid granules, the rigid granules are selected from the group consisting of gravel, small stones, and crushed rocks, and the coating is a thermoplastic polymer composition comprising 95 to 99% by weight of polyethylene terephthalate with a remainder of the thermoplastic polymer composition being 1% to 5% by weight of a colorant or a compound capable of retarding ultraviolet degradation, and (b) a continuous network of open channels passing through the thickness of the paver in between the plurality of the coated rigid granules, said open channels allowing water to permeate through the paver; wherein the paver excludes rubber and crushed glass.

2. The tough water-permeable paver as claimed in claim 1, wherein the weight proportion of thermoplastics composition added to the granules is in the range of 60 to 90 g per kg of granules.

3. The tough water-permeable paver as claimed in claim 1, wherein an average diameter for each of the granules is between 7 to 12 mm.

4. The tough water-permeable paver as claimed in claim 1, wherein an average diameter for each of the granules is between 12 to 18 mm.

5. The tough water-permeable paver as claimed in claim 1, wherein each granule of the paver is covered by a single coating only of the thermoplastic polymer composition.

\* \* \* \* \*